UNITED STATES PATENT OFFICE.

ARCHIBALD K. LEE, OF GALVESTON, TEXAS, ASSIGNOR OF ONE-THIRD OF HIS INTEREST TO JAS. R. McCLINTOCK.

IMPROVEMENT IN PROCESSES OF REDUCING ASPHALTUM TO A LIQUID.

Specification forming part of Letters Patent No. 162,394, dated April 20, 1875; Reissue No. 8,921, dated October 7, 1879; application filed June 10, 1875.

*To all whom it may concern:*

Be it known that ARCHIBALD K. LEE, of the city and county of Galveston and State of Texas, invented an Improved Process of Reducing Asphaltum to a Liquid, on which Letters Patent of the United States No. 162,394 were granted to him April 20, 1875; that ARCHIBALD K. LEE and JAMES R. McCLINTOCK are now the owners of said Letters Patent, and that the following is a full, clear, and exact description of the same.

The object of my present improvement is to produce, as an article of commerce, what is now unknown to the trade—viz., liquid or semi-fluid asphaltum; and being a product produced through the action of a solvent, and without the agency of heat, it does not chill, as does melted asphaltum, but, on the contrary, can be prepared in any given quantity, barreled, and transported to any desired point in a condition ready for use, without the labor, expense, and delay of melting, for paving and roofing purposes, and one most admirably adapted for use by manufacturers of varnish and japan.

The nature of my invention consists in the process, hereinafter described, by which I am enabled to reduce asphaltum to a liquid, and to hold the same in a semi-fluid condition without heat, but simply through the action of a rectified concentrated anhydrous product or oil of turpentine, which I obtain from the redistillation of the spirits of turpentine of commerce, and which product—viz., fluid asphaltum—as an article of commerce, has never, prior to my invention, been known to the trade.

The description and operation of my invention are as follows:

I take the spirits of turpentine of commerce, and in an ordinary alcohol-still revaporize the same. The vapor, as rapidly as generated, is caused to pass through an apparatus similar to that used in connection with alcohol-stills, and consists of a column, goose, and condensing-worm, for the purpose of freeing the turpentine, as far as possible, from water, acids, and other impurities, which may have been carried off or brought over from the still during the process of its former distillation. After this step in the redistillation of the turpentine is completed, practical experience has demonstrated the fact that some condensed steam, impregnated with acid and a resinous substance, yet remains in the distillate, and which it is essentially necessary should be entirely eliminated or thrown off before it is possible to obtain the perfect anhydrous product which I desire to use in reducing the asphaltum to a fluid. I therefore cause the distillate, after it has passed through the column, goose, and condensing-worm, to enter a separating-vessel, provided with a discharge-tube at its upper section for the turpentine to pass out, and another discharge-tube at its lower section for drawing off the water, acids, and resinous substance, and, whose specific gravity being greater than that of the turpentine, have been separated from the turpentine in the vessel and have fallen to the bottom of the same. The turpentine then passes to an apparatus consisting of a rectifying-tub, packed or charged with equal parts of animal and vegetable charcoal, and caused to pass through said composition, and where the perfect and entire separation of all the condensed steam, acids, and resinous substance which may yet remain is effected, and the result is that a product is obtained which is a concentrated rectified anhydrous oil of turpentine. Having thus treated the turpentine to obtain this product, which I desire to use in reducing the asphaltum to a fluid, and the retaining of the same in a semi-fluid condition, I now take the crude asphaltum, either Trinidad or Cuban, and pulverize or reduce the same to a coarse or fine powder, and then place it in a suitable vessel and pour on the oil obtained from the spirits of turpentine, as hereinbefore described. The mass is then agitated or stirred by any suitable means, and the asphaltum is rapidly dissolved, the oil readily taking up from four to eight times its quantity, according to the use in connection with which the asphaltum is to be employed, and consequently the degree of consistency required.

The fluid asphaltum thus obtained can readily be barreled and transported, and is ready for use without being heated or any heat whatever having been used in the producing of the fluid asphaltum, and, as such, is an article now entirely unknown to commerce.

Independent of the great advantage arising from the fact that by my process I am enabled to hold the asphaltum in fluid—something that has never hitherto been essayed—there is a yet greater advantage in the fact that the asphaltum is reduced by my process to a fluid or liquid condition without heat. All who are familiar with the reducing of asphaltum to a liquid for use in either varnish or japan manufactures, or as an ingredient in the construction of pavements, roofing-compositions, &c., are aware of the intense heat which is required to melt the same, and which soon destroys the kettles, and thus renders the process very expensive; but this is not the greatest objection to the present system of melting asphaltum. Heat alone is not sufficient; dead-oils have to be added, and which contain acids which are pernicious; and, besides, (and this is the greatest objection,) the intense heat burns out many of the most valuable properties of the asphaltum, while with my process all are retained and held.

What I claim as new, and desire to secure by Letters Patent of the United States, is—

1. As a new article of commerce, fluid asphaltum, the same having been reduced to a liquid through the action of a solvent and without heat, for paving, roofing, and other purposes.

2. The herein-described process of reducing asphaltum to a liquid and holding the same in a fluid condition without heat or the use of dead-oils, but through the action alone of a product obtained by the redistillation of the spirits of turpentine, and in then separating from the same the water, acids, and all resinous substances, and in then concentrating and rectifying the same, substantially as and for the purpose specified.

In testimony whereof I have signed my name to this specification before two subscribing witnesses.

ARCHIBALD K. LEE.

Witnesses:
W. C. STRAWBRIDGE,
WILLIAM PARENT.